US012788019B2

(12) United States Patent
Macaigne et al.

(10) Patent No.: US 12,788,019 B2
(45) Date of Patent: Nov. 10, 2026

(54) MAGNESIUM HYDROXIDE FOR USE AS A CONTACT FUNGICIDE IN AGRICULTURE

(71) Applicant: Timab Magnesium, Dinard (FR)

(72) Inventors: Nicolas Macaigne, La Chapelle-Chaussée (FR); Julie Duclos, La Richardais (FR)

(73) Assignee: TIMAB MAGNESIUM, Dinard (FR)

( * ) Notice: Subject to any disclaimer, the term of this patent is extended or adjusted under 35 U.S.C. 154(b) by 1044 days.

(21) Appl. No.: 17/440,575

(22) PCT Filed: Mar. 19, 2020

(86) PCT No.: PCT/FR2020/050601
§ 371 (c)(1),
(2) Date: Sep. 17, 2021

(87) PCT Pub. No.: WO2020/188225
PCT Pub. Date: Sep. 24, 2020

(65) Prior Publication Data

US 2022/0183298 A1 Jun. 16, 2022

(30) Foreign Application Priority Data

Mar. 21, 2019 (FR) ....................................... 1902955

(51) Int. Cl.

| | |
|---|---|
| ***A01N 59/06*** | (2006.01) |
| ***A01N 25/04*** | (2006.01) |
| ***A01N 25/14*** | (2006.01) |
| ***A01P 3/00*** | (2006.01) |

(52) U.S. Cl.
CPC ............. *A01N 59/06* (2013.01); *A01N 25/04* (2013.01); *A01N 25/14* (2013.01); *A01P 3/00* (2021.08)

(58) Field of Classification Search
CPC ........ A01N 59/06; A01N 25/04; A01N 25/14; A01P 3/00
See application file for complete search history.

(56) References Cited

U.S. PATENT DOCUMENTS

| | | | |
|---|---|---|---|
| 5,906,804 | A | 5/1999 | Aral et al. |
| 6,827,766 | B2 | 12/2004 | Carnes et al. |

FOREIGN PATENT DOCUMENTS

| | | | |
|---|---|---|---|
| JP | 2002173404 A | | 6/2002 |
| WO | WO 2015100468 A1 | | 7/2015 |
| WO | WO 2017/219068 A1 | | 12/2017 |

OTHER PUBLICATIONS

Thompson, A.K. Banana (*Musa* spp.) Postharvest Biology and Technology of Tropical and Subtropical Fruits: Açai to Citrus. (Year: 2011).*
French Search Report of FR 1902955, Nov. 4, 2019, 2 pages.
International Search Report of International Application No. PCT/FR2020/050601 dated Jul. 2, 2020 (English Translation), 5 pages.
International Preliminary Report on Patentability of International Application No. PCT/FR2020/050601 dated Sep. 16, 2021 (and English Translation), 13 pages.

* cited by examiner

*Primary Examiner* — Jessica Worsham
(74) *Attorney, Agent, or Firm* — Lippes Mathias LLP

(57) ABSTRACT

The disclosure relates to a contact fungicide used in agriculture, including particles of a magnesium product including magnesium hydroxide, the purity of which is greater than 86% by mass on a dry basis, and the particle size of which is characterized by a D50 of between 1 micron and 10 microns.

23 Claims, 3 Drawing Sheets

MAGNESIUM HYDROXIDE FOR USE AS A CONTACT FUNGICIDE IN AGRICULTURE

BACKGROUND OF THE DISCLOSURE

The invention relates to a fungicide based on a magnesium product comprising magnesium hydroxide. This fungicide may be used in organic farming. The invention also relates to a method for controlling a fungal pathogen and for treating a fungal disease of crop, notably via the foliar route.

STATE OF THE ART

It has been suggested in the prior art, and notably in U.S. Pat. No. 6,827,766, that nanoparticles comprising magnesium oxide and magnesium hydroxide have improved biocidal properties. However, nanomaterials remain expensive to produce, and special filtration equipment is required to limit the loss of yield and the risks of inhalation during manufacture. What is more, the regulatory constraints linked to the use of nanoparticles are very high in agriculture.

To overcome these drawbacks, the inventors of patent application WO 2015/100468 proposed to agglomerate magnesium hydroxide nanocrystals in the form of a composite. Said document teaches that the biocidal activity depends on the size of the magnesium hydroxide crystals and not on the size of the particles. The composite is obtained by calcination of a rock comprising magnesium carbonate and/or magnesium hydroxide to obtain magnesium oxide, which is then hydrated to give magnesium hydroxide. The calcination process, known as a “flash” calcination process, is special since it is performed at low temperature for a very short period. However, flash calcination requires very high investment costs, and consumes a large amount of energy. Moreover, the European regulations do not authorize the use of products obtained by calcination in organic farming. In patent application WO 2015/100468, magnesium hydroxide is obtained from magnesium oxide particles which have a degree of calcination of greater than 90%, a particle size of between 10 and 100 microns, very high porosity (greater than 0.5), a specific surface area (SSA) of greater than 150 $m^2/g$ and comprising crystalline domains less than 20 nm in size.

A need consequently remains to propose a biocide based on magnesium hydroxide, the manufacturing cost of which is compatible with large-scale agricultural use, and which may be authorized in organic farming.

It is also desirable to have available a biocidal product based on magnesium hydroxide which has biological activity comparable to that of nanomaterials without having any handling or regulatory problems.

Now, contrary to what is suggested in the prior art, the inventors have discovered that the biocidal activity of magnesium hydroxide particles, more precisely their fungicidal activity, can be improved independently of their crystallinity and without the need to proceed via a flash calcination process.

SUMMARY OF THE DISCLOSURE

Thus, one subject of the invention is a contact fungicide for agriculture, comprising particles of a magnesium product comprising magnesium hydroxide, said particles having a magnesium hydroxide purity of greater than or equal to 86% by mass relative to the mass of the magnesium product on a dry basis, and having a particle size characterized by a D50 of between 1 and 10 microns.

The fungicide has the advantage of having higher fungicidal activity than that of the magnesium biocides of the prior art whether or not supplemented with oxygen peroxide. A fungicide according to the invention makes it possible to protect crops against pathogenic fungi.

The fungicide of the invention, when in the form of a suspension, has the advantage of being in liquid form, which facilitates its use.

In general, plants can only receive a limited amount of solid particles of magnesium product on the surface of their leaves. The reason for this is that, beyond a certain threshold, there is a risk of phytotoxicity taking place (burning, facilitated penetration of pathogens). The fungicide of the invention has no phytotoxicity at the doses at which it is effective.

The fungicide of the invention has the advantage of creating a network of dense particles at the surface of the plant whilst applying a small amount of product. Without being bound by any theory, it is thought that the very high purity of the magnesium product is reflected by a greater number of active unit members in the network, and by increased fungicidal efficacy. The inventors have in point of fact found that a product of higher D50 forms agglomerates preventing homogeneous distribution of the fungicide on the plant.

DETAILED DESCRIPTION OF THE DISCLOSURE

Figure 1:
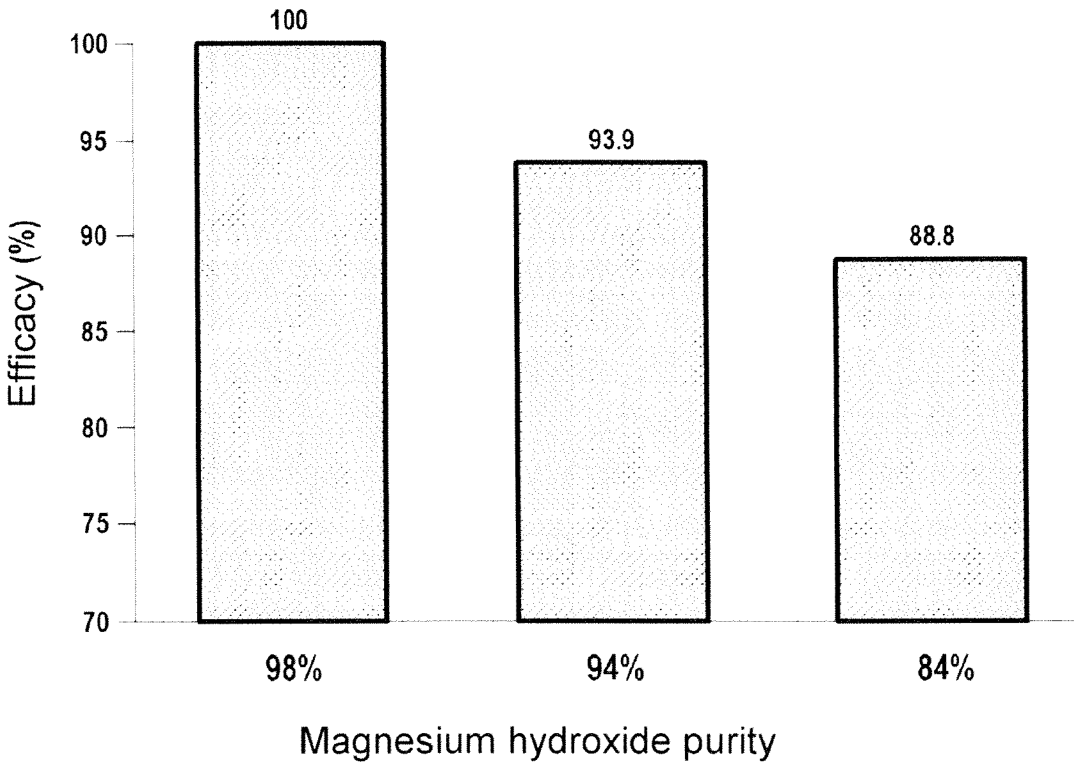
FIG. 1 shows the fungicidal efficacy of two magnesium products used in the context of the invention and of one reference magnesium product, against the pathogenic fungus of grapevine mildew.

For the purposes of the invention, the magnesium hydroxide purity of the particles of a magnesium product comprising magnesium hydroxide is expressed as a mass percentage relative to the mass of the magnesium product on a dry basis. The term “purity of the magnesium product on a dry basis” means the magnesium hydroxide content of the magnesium product in the present description.

The magnesium product used in the context of the invention may be pure (containing only magnesium hydroxide) or may comprise, besides magnesium hydroxide, other magnesium compounds in silicate, carbonate, chloride or sulfate form, these impurities possibly originating from the starting material used for preparing the magnesium product particles. The starting material may be a rock or a synthetic product comprising magnesium hydroxide.

For the purposes of the invention, the purity is defined as being the purity of the magnesium product particles on a dry basis, i.e. the mass of magnesium hydroxide relative to the mass of the magnesium product particles which have been dried to remove all or part of the free water it contains, for example after baking the product at 105° C. for 2 hours. The dried particles preferably contain less than 1% by mass of free water. The amount of water may be measured via any method known to those skilled in the art.

The purity of the magnesium product on a dry basis may be determined via any method known to those skilled in the art. A first method uses the X-ray diffraction technique. A second method involves chemical analysis of the magnesium product to measure its content of impurities, and measurement of the loss on ignition of the magnesium product. The loss on ignition may consist in measuring the loss of mass of the magnesium product between 250° C. and 550° C. The mass of the product on conclusion of this heat treatment is equal to the sum of the mass of MgO and the mass of the impurities. The purity of the magnesium product particles comprising magnesium hydroxide, for the purposes of the invention, is subsequently calculated from the measured MgO content, according to the following formula: % $Mg(OH)_2$=% MgO*58.3/40.3.

The amount of magnesium hydroxide in the magnesium product particles is greater than or equal to 86% by mass on a dry basis. The impurities that the product may contain are, for example, calcium oxide, ferric oxide, silica, magnesium carbonate, magnesium silicate or magnesium sulfate. The silica content is preferably less than or equal to 2% and more preferably less than or equal to 1.5% by mass on a dry particle basis.

The purity of the magnesium product particles may be expressed as the difference between the mass of the magnesium product and the mass of all the impurities (any compound other than magnesium hydroxide) which it contains, relative to the mass of magnesium product on a dry basis.

The amount of magnesium hydroxide in the magnesium product particles is greater than or equal to 86% and less than or equal to 100% by mass relative to the mass of the dried magnesium product. It is, for example, greater than or equal to a value chosen from the group consisting of 87%, 88%, 89%, 90%, 91%, 92%, 93%, 94%, 95%, 96%, 97% and 98%, and less than or equal to 99%.

The particle size of the magnesium product particles comprising magnesium hydroxide, for the purposes of the invention, is the particle size of the magnesium product particles on a dry basis.

The particle size of the particles may be characterized by a D50 of between 1 and 10 microns. In the context of the present description, the term "between . . . and . . . " excludes the limits of the range of values, whereas the term "ranging from . . . to . . . " includes the limits of the range of values. The D50 of the particles containing magnesium hydroxide is less than 10 microns, preferably less than 6 microns, or even less than 5 microns and greater than 1 micron. The D50 may be measured according to any conventional method known to those skilled in the art. The particle size may also be characterized by a D90 ranging from 1 micron to 30 microns, preferably ranging from 1 micron to 12 microns.

The specific surface area (SSA) of the dried magnesium product particles (i.e. the particles before hydration or before optional suspension in water) preferably ranges from 10 $m^2/g$ to 100 $m^2/g$, for example from 10 $m^2/g$ to 50 $m^2/g$. The specific surface area of the dried magnesium product particles is, for example, less than a value chosen from the group consisting of 100, 90, 80, 70, 60, 50, 40, 30, 25 and 20 $m^2/g$. The specific surface area of the dried magnesium product particles more preferably ranges from 10 $m^2/g$ to 18 $m^2/g$. The specific surface area (SSA) defined in the present description is measured on dried particles (before their optional suspension in water) and not on hydrated particles or on particles which are in suspension in water.

The magnesium product particles comprising magnesium hydroxide may be obtained by chemical synthesis, by calcination or by mineral extraction from a rock containing same.

In a particular embodiment, the magnesium product particles comprising magnesium hydroxide are obtained by mineral extraction of brucite, followed by grinding of the rock. In this embodiment, the process for preparing the particles does not comprise a calcination step. A formula based on brucite (natural magnesium hydroxide) makes it possible to propose a formula that can be used in organic farming. In a preferred embodiment of the invention, the fungicide is a foliar fungicide for organic farming. The term "organic farming" means a cultivation method in accordance with the regulations (EC) No. 203/2012 of Mar. 8, 2012 amending regulation (EC) No. 889/2008 relating to the modalities for application of regulation (EC) No. 834/2007 of the Council as regards organic wine, and in accordance with regulation (EC) 889/2008.

In another embodiment, the magnesium product particles comprising magnesium hydroxide are obtained by calcination in a furnace, followed by hydration. The calcination furnace is preferably a rotary furnace, a vertical furnace or a furnace on a fluidized bed enabling slow calcination.

When the magnesium hydroxide of the invention is obtained by calcination, it is preferable for the calcination process to be a slow calcination process as opposed to a fast calcination process, known as "flash" calcination. For the purposes of the invention, the term "flash calcination process" means a process in which the calcination chamber is in the form of a vertical tube in which the mineral particles to be calcined are injected at the top of the tube. A vapor stream may be used to entrain the particles in the furnace; in this case, the vapor and the mineral particles are injected simultaneously. The heat required for the calcination has the particular feature of being generated outside the calcination chamber. The heat is transferred by diffusion into the chamber across the wall by means of a hot air flow. The hot air flow may be applied counter-currentwise relative to the particle stream to render the calcination temperature uniform throughout the tube. According to this process, the particles undergo an abrupt increase in temperature over a very short period (a few seconds at the very most), the heat shock produced having the effect of considerably increasing the specific surface area and the porosity of the particles. To maximize the specific surface area of the particles leaving the furnace, it is first necessary to perform fine grinding of the rock (<100 μm). The temperature is chosen to be as low as possible, preferentially from 550° C. to 750° C. The specific surface area of the magnesium oxide particles obtained by flash calcination is typically greater than 150 $m^2/g$, or even greater than 200 $m^2/g$.

In a conventional slow calcination process used in the context of the invention, the furnace may be a vertical furnace, a multi-hearth furnace or a horizontal rotary furnace. Vertical furnaces and multi-hearth furnaces are particularly suitable for preparing reactive and caustic products. A vertical furnace is a cylindrical or ellipsoid tube in which the ore is introduced at the top of the tube with a combustible (coal, gas or petroleum). The ore-combustible mixture subsequently falls into a combustion zone before leaving the furnace. The coal may also be pyrolyzed in a boiler before injection into the chamber in the form of carbonaceous gas. The calcination temperature of this furnace is 800° C.-950° C. with a long residence time, between 7 to 8 hours. A multi-hearth furnace is a vertical cylinder containing a certain number of stages equipped with a burner (hearth), the temperature of which is between 750 and 1000° C. The ore is entrained from the top of the cylinder by a rotating blade into the successive hearths. There may be between 10 and 14 hearths in these furnaces. The residence time of the ore in the furnace is variable according to the number of hearths and the rotation speed of the mechanism, and is generally counted in hours. Horizontal rotary furnaces are more versatile: they can produce reactive, caustic or refractory products by means of a temperature range which may extend from 600° C. to 1600° C. The residence time is from 3 hours to 6 hours. It is an inclined horizontal tube (about 3°-4°). The ore is introduced on the higher side and combustion takes place on the lower side, counter-currentwise. The ore is entrained by a slow rotating motion of the tube. The latter consumes more energy but accepts coarser particles at the furnace inlet.

In the context of the present invention, it is preferable for a magnesium hydroxide obtained via a calcination process to be obtained via a slow calcination process, in which the residence time of the magnesium hydroxide used as starting material is greater than 1 minute, preferably greater than 30 minutes and more preferably greater than 1 hour. The residence time is preferably less than 12 hours or less than 10 hours.

The fungicide of the invention may contain, besides the magnesium product particles comprising magnesium hydroxide, other additives. These additives, when they are present, are preferably biobased so that the fungicide can advantageously be used as a contact fungicide in organic farming, preferably as a foliar fungicide in organic farming.

The fungicide of the invention may contain additives such as an anti-leaching agent so as to prevent losses of efficiency during rainfall.

The fungicide may be in the form of a particle powder or of a suspension obtained by dispersing the particles in water.

In a particular embodiment, the fungicide of the invention is in the form of a suspension and preferably comprises at least one dispersant and/or at least one surfactant to obtain a suspension that is stable on storage of the product, or to resuspend the magnesium hydroxide after shaking the product, for the time during which it is applied to the plants. The magnesium product particles preferably represent from 40% to 65% by mass, for example from 50% to 55% by mass, relative to the mass of the suspension.

Another subject of the invention is a liquid composition for the foliar biocidal treatment of a crop, characterized in that it consists, to 90% by mass:

- of water
- of particles of a magnesium product having a magnesium hydroxide purity of greater than or equal to 86% by mass relative to the mass of the magnesium product on a dry basis, and having a D50 of between 1 and 30 microns,
- of a product for treating crops chosen from the group comprising fertilizers, notably manures, biostimulants, natural defense stimulants (NDS) and mixtures thereof, and
- of a formulating agent and/or adjuvant chosen from the group comprising preserving agents, emulsifiers, surfactants, dispersants, antifreezes, antifoams, humectants, penetrants, wetting agents, spreading agents, droplet-weighting agents, anti-drift agents, tack agents and retaining agents, and mixtures thereof.

For the purposes of the invention, the term "biocide" means a fungicidal, herbicidal, pesticidal, bactericidal, insecticidal and/or virucidal product.

In this liquid composition, a proportion of the particles preferably has a D50 of between 1 and 10 microns before being placed in water. The proportion of the particles is preferably the major proportion: it is preferably greater than 50%, more preferably greater than 90% and more preferably greater than 95% by mass relative to the total mass of the particles that are suspended in water.

Another subject of the invention is a process for the fungicidal treatment of a crop, which consists of the foliar application of the fungicide or the composition described previously.

The aims of the process are notably to improve the growth and development of the crops, to improve the crop yield, to stimulate and reinforce the crops, notably by improving their resistance to pathogens, and/or to improve the health quality of the crops.

The fungicide and the composition of the invention are advantageously free of a pesticide obtained by chemical synthesis chosen from the group comprising fungicides, herbicides, insecticides and mixtures thereof. It is preferred to use elicitors which stimulate the defense system of the plant systemically, as an alternative to plant protection products.

The fungicide or the composition of the invention may be used for its foliar application to crops, said foliar application possibly being performed at the time of appearance of the first leaves and/or at any other time up to the harvesting of the crop. This application is of the order of 3 to 15 L per hectare.

The crop may notably be chosen from the group comprising:

- field crops, such as cereals, oilseed crops, protein crops, fodder legumes, forage grasses or sugar-yielding crops,
- vegetable or market-garden crops, notably fresh vegetables,
- fruit crops, for instance stone fruit, pome fruit, kernel fruit, bunched fruit, small fruit or fruit from hot regions,
- aromatic and medicinal plants,
- floral and ornamental crops.

When applied at a dose ranging from 0.5 v/v % (i.e. 0.5 L of suspension per 100 liters of water for watering the crop) to 5 v/v % (i.e. 5 L of suspension per 100 liters of water for watering the crop), the fungicide of the invention in the form of a suspension may reach an efficacy of greater than 85%.

Another subject of the invention relates to a method for controlling a fungicidal pathogen and treating a fungal disease of a crop, which consists of the preferably foliar application of the fungicide or the composition described previously.

The fungal pathogen may be chosen from the group consisting of *Mycosphaerella fijiensis, Phytophthora megakarya, Phytophthora palmivora, Fusicladium oleagineum* or *Cycloconium oleaginum, Colletotrichum acutatum, Phytophthora infestans, Bremia lactucae, Plasmopara viticola, Erysiphe necator, Guignardia bidwellii, Sclerotinia sclerotiorum, Magnaporthe grisea, Sphaerotheca pannosa* and *Septoria tritici* (also known as *Zymoseptoria tritici*).

The fungal disease may be chosen from the group consisting of black sigatoka of banana, brown rot of cocoa pods, olive leaf spot, bitter rot of apple, mildew of potato, tomato, lettuce and grapevine, powdery mildew of grapevine and of rose, black rot of grapevine, *septoria* disease of wheat, *sclerotinia* stem rot of oilseed rape, and rice blast.

The invention is illustrated in greater detail by the implementation examples that follow.

Example 1: Preparation of the Fungicide of the Invention

A first suspension (Suspension A) is prepared from particles obtained by grinding and screening a brucite having a magnesium hydroxide purity on a dry basis equal to 92%. The D50 of the particles after screening ranges from 3 to 4 μm. The D90 ranges from 12 to 13 microns. The particles contain less than 1.3% by mass of SiO2 and their specific surface area is of the order of 13 m2/g after they have been suspended in water.

The particles are suspended as follows

45% by mass of water

55% by mass of magnesium product particles comprising magnesium hydroxide.

A second suspension (Suspension B) is prepared from particles obtained by chemical synthesis, more precisely by precipitation using a brine of MgCl2 and lime. The D50 of the magnesium hydroxide particles after screening ranges from 2 to 3 μm. The D90 ranges from 5 to 6 microns. The magnesium hydroxide purity on a dry basis is 97.5%. The particles contain less than 1.5% by mass of SiO2 and their specific surface area is of the order of 17 m2/g after they have been suspended in water.

The particles are suspended as follows:

47% by mass of water

53% by mass of magnesium product particles comprising magnesium hydroxide.

Example 2: Evaluation of the Antifungal Efficacy

Efficacy tests were performed with suspensions A and B prepared in Example 1 during the treatment of various diseases, in the laboratory, in a greenhouse or in the open field, depending on the case. The results are presented in Table 1 below.

TABLE 1

| Crop | Pathogen/ disease | Fungicide suspension | Dose (L/ha or v/v %)- number of applications | Incidence of the disease | Efficacy |
|---|---|---|---|---|---|
| Banana in greenhouse | Black sigatoka | B | 0.9 v/v %-1 application | Moderate to low | >70% |
| Cocoa in open field | Brown rot | B | 14 L/ha-5 applications | 47% (moderate) | 79% |
| Cocoa in laboratory | Brown rot | A | 0.5 v/v%-1 application | Total | 100% |
| Olive tree in open field | Olive leaf spot | B | 10 L/ha-3 applications | 75% (high) | >60% |
| Grapevine in open field | Mildew | B | 10 L/ha-5 applications | >75% (very high) | >75% |
| Grapevine in laboratory | Powdery mildew | B | 0.8 v/v%-1 application | Total | 86% |
| Wheat in laboratory | Septoria disease | B | 4 v/v%-1 application | Total | 55% |
| Rice | Blast | BX | 4-8 L/ha-3 applications | Moderate to low | 30-45% |
| Rose bush | Powdery mildew | B | 5-10 L/ha-5 applications | Moderate (50%) | 30-67% |
| Tomato | Mildew | B | 4-8 L/ha-1 application | High (>60%) | 30-50% |

Example 3: Evaluation of the Phytotoxicity

It was demonstrated that the fungicide of the invention has no phytotoxicity at the doses at which it is effective on field crops. Each of the tests was performed according to "Good experimental practice".

Suspension A manufactured in Example 1 was applied at a weekly or two-weekly rate over the period of sensitivity of the plant to the pathogen. The same test is performed on the same crop the following year.

Suspension A was applied to the plant leaves. The appearance of these leaves was then studied. The phytotoxicity is controlled visually and gives rise to a grade from 0 to 10 (0 indicating an absence of toxicity). A grade of 0 was attributed in each of the tests performed. The results are given in Table 2 below.

TABLE 2

| Crop (pathogen) | Dose (in L/ha) | Number of applications | Phytotoxicity (grade from 0 to 10) |
|---|---|---|---|
| Grapevine (Plasmopara Viticola) | 10 | 8 | 0 |
| Cocoa (Phytophthora megakarya) | 13.8 | 12 | 0 |
| Olive tree (Cycloconium oleaginum) | 10.7 | 3 | 0 |
| Banana tree (Mycosphaerella fijiensis) | 7.9 | 1 | 0 |

Comparative Example 4: Comparison Between a Product of the Invention and a Product of the Prior Art The fungicidal activity of a product of the invention and of a product of the prior art was evaluated. Their characteristics are given in Table 3.

Conditions Under which the Study is Performed

The study is performed in the laboratory. The solutions are applied to the vegetation (grapevine leaf). These leaves are then inoculated with the pathogenic organism *Guignardia bidwellii* responsible for black rot of grapevine.

After 12 days of incubation, grading of the colonization and of the sporulation of the fungus is performed under a binocular magnifier. An average of the damage on the 10 repetitions is calculated and makes it possible to obtain the efficacy of the method relative to the untreated control.

Results

The product comprising magnesium hydroxide used in the context of the invention has higher fungicidal efficacy than that of the product of the prior art comprising a magnesium hydroxide nanocrystal composite, obtained by flash calcination according to the teaching of patent application WO 2015/100468. The results are given in Table 3 below.

TABLE 3

| | % MgO measured | Purity expressed as a percentage of $Mg(OH)_2$ | g dry matter produced/L | g MgO/L | % efficacy |
|---|---|---|---|---|---|
| Product of the invention | 67.5% | 97.5% | 1.06 | 0.71 | 38 |
| Product of the prior art | 59.3% | 84% | 1.19 | 0.71 | 23.4 |

Comparative Example 5: Comparison with a Magnesium Hydroxide of Different Purity Three magnesium products were analyzed by X-ray diffraction in order to determine their MgO purity and their composition.

Three magnesium products having a D50 of between 4 and 8 microns, respective magnesia purities of 98% (comprising 2% calcite), 94% (comprising 3% periclase and 3% calcite) and 84% (comprising 14% akermanite and 2% calcite) are studied here.

The efficacy of these three magnesium products in combating the pathogenic fungus of grapevine mildew (*Plasmopara viticola*) at a dose of 1% is presented in Table 4 and in FIG. 1.

TABLE 4

| Content as % MgO measured | Purity of the magnesium product on a dry basis (% $Mg(OH)_2$) | Efficacy |
|---|---|---|
| 67.7% | 98% | 100% |
| 67.9% | 94% | 93.9% |
| 59.3% | 84% | 88.8% |

The loss of purity of the magnesium product gives rise to a large reduction in its fungicidal efficacy despite a high total content of magnesium. Thus, the purity of the magnesium hydroxide on a dry basis is a key point of its efficacy.

Comparative Example 6: Comparison with Magnesium Hydroxides not in Accordance with the Invention The efficacy of three magnesium products of different particle sizes in combating grapevine mildew was studied. The test was performed in the laboratory in order to determine the impact of the particle size on the fungicidal efficacy of magnesium.

Suspension A of Example 1 was used and was then compared with an identical suspension, the only difference being that the magnesium hydroxide was replaced with a product from another source: reference product A or reference product B. The results are presented in Table 5 below:

TABLE 5

| | Product/Dose | 1 v/v% |
|---|---|---|
| Efficacy | Product of the invention Suspension A in accordance with Example 1 | 89.30% |
| | Reference product A | 82.50% |
| | Reference product B | 64.10% |

Reference product A has the following specificities: D50=17 μm, obtained by calcination, MgO content of 67.4% and Mg(OH)2 purity=92%.

Reference product B has the following specificities: D50=23.9 μm, obtained by calcination, MgO content of 66.7% and Mg(OH)2 purity=62%.

The particle size plays a role in the efficacy of the fungicide. A D50 of greater than 10 microns does not make it possible to obtain a product of sufficient efficacy, contrary to what is suggested in the prior art.

Comparative Example 7: Bacteriostatic Activity of the Products of the Invention and Bactericidal Activity of the Products of the Prior Art The object of this study is to show that the process for manufacturing magnesium hydroxide does indeed have an impact on its fungicidal activity and that the products derived from patent WO 2015/100468 and from the present invention are different. The product obtained according to patent WO 2015/100468 which forms part of the prior art has a higher bactericidal effect than that of the invention.

The antimicrobial properties of various magnesium products comprising magnesium hydroxide in combating the model microorganism *Pseudomonas aeruginosa* DSM 939 were evaluated. The method used follows the European standards for the testing of antibacterial efficacy.

The test demonstrates the bacteriostatic (and non-bactericidal) activity of three hydroxides in accordance with the invention and the bactericidal activity of a hydroxide of the prior art. The three hydroxides of the invention are suspended at a dose of 72.5 g of magnesium hydroxide per liter of nutrient solution (i.e. an equivalent of 50 g of MgO per liter of nutrient solution).

The first magnesium hydroxide is obtained from chemical synthesis: it is in accordance with the product used in Example 1 for preparing suspension B. Its activity is measured relative to Control 1.

The second magnesium hydroxide is obtained from calcination followed by hydration; its characteristics are a D50 of 10 μm, an MgO content of 61.9% after hydration, and an Mg(OH)2 purity of 87%. Its activity is measured relative to Control 2. The third magnesium hydroxide is obtained from brucite: it is in accordance with the product used for preparing suspension A of Example 1. Its activity is measured relative to Control 3.

The bactericidal activity of a magnesium product of the prior art was measured at three different doses (25 g MgO/L equivalent to 36.2 g Mg(OH)2/L—Control 3, 50 g MgO/L equivalent to 72.5 g Mg(OH)2/L—Control 2 and 75 g MgO/L equivalent to 108.7 g Mg(OH)2/L—Control 1).

The product of the prior art comprises a magnesium hydroxide nanocrystal composite; it is obtained by flash calcination according to the teaching of patent application WO 2015/100468.

Each growth control of the strain consists of sterile distilled water.

Figure 2:
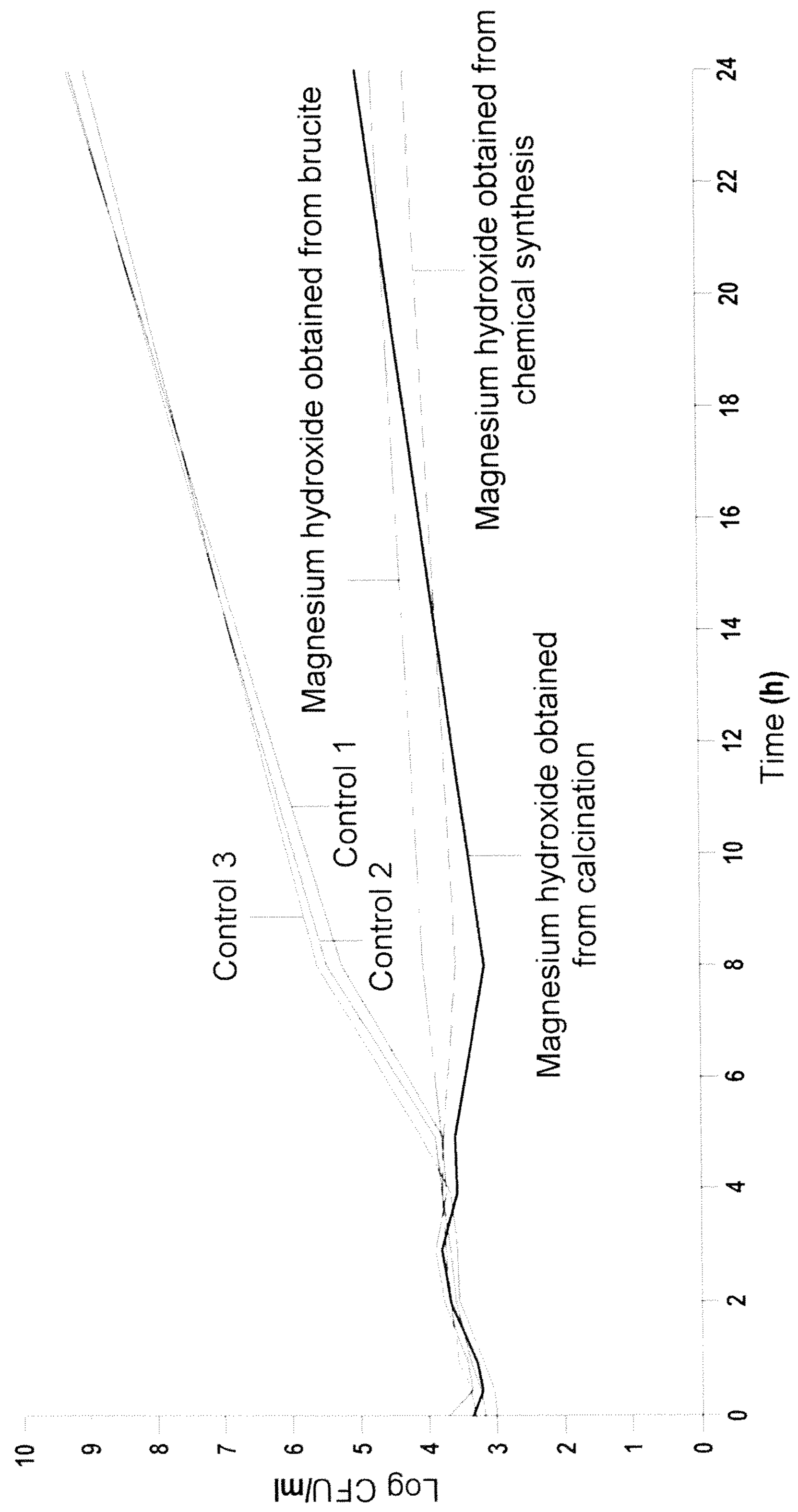
FIG. 2 shows the bacteriostatic activity of three fungicides according to the invention.
Figure 3:
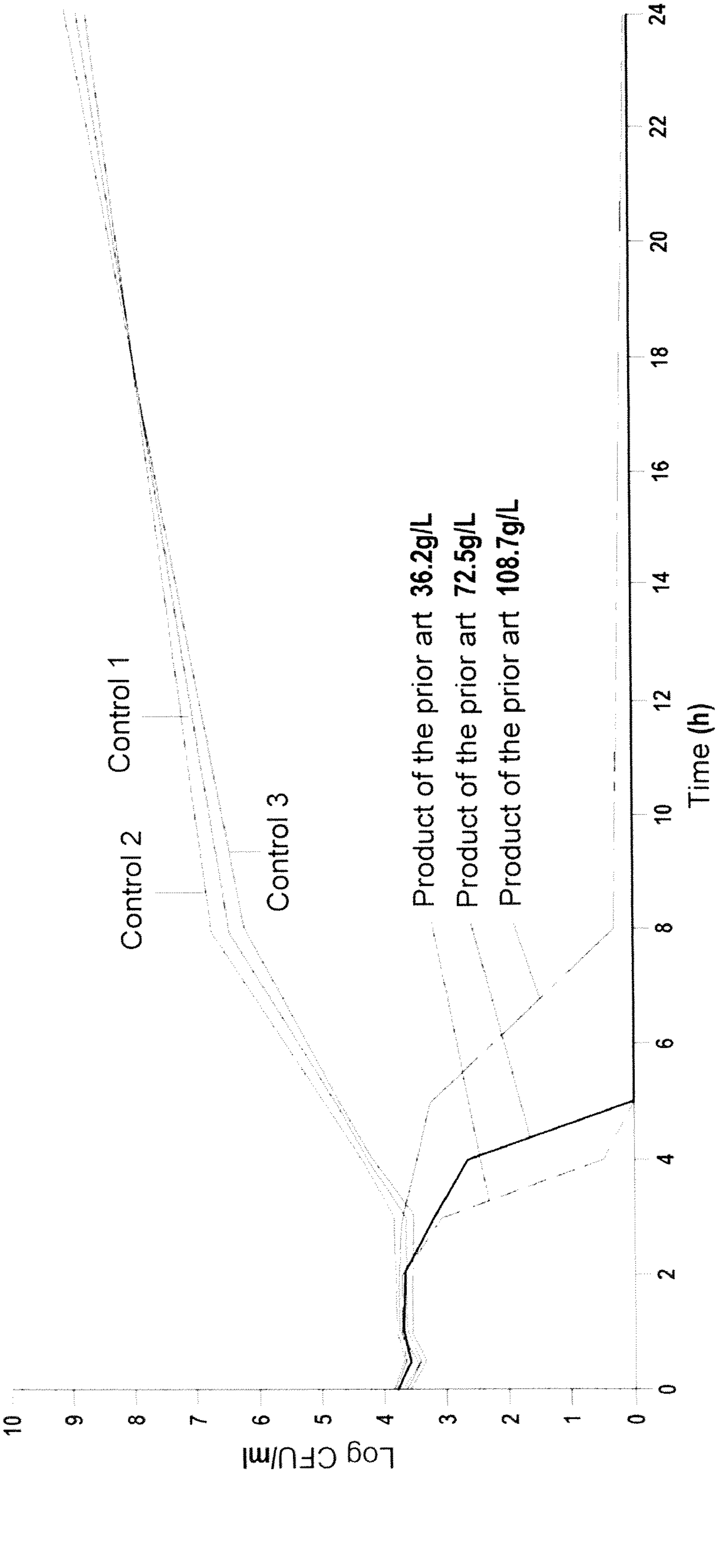
FIG. 3 illustrates the bactericidal activity of a magnesium product of the prior art at three different doses.

Summary table of the hydroxides tested in FIGS. 2 and 3.

| | Origin | D50 | Purity: $Mg(OH)_2$ content | SSA when dry, before placing in suspension | SSA after placing in suspension |
|---|---|---|---|---|---|
| Hydroxide of the invention | Brucite | 3-4 μm | 92% | 13 $m^2/g$ (already naturally hydrated) | 13 $m^2/g$ |
| Hydroxide of the invention | Chemical synthesis | 2-3 μm | 97.5% | Non-existent since obtained as a solution | 17 $m^2/g$ |
| Hydroxide of the invention | Conventional calcination followed by hydration | 10 μm | 87% | <100 $m^2/g$ | <18 $m^2/g$ |
| Product of the prior art | Flash calcination followed by hydration | 10 μm | 84% | >150 $m^2/g$ | 20 $m^2/g$ |

The product obtained according to patent WO 2015/100468 which forms part of the prior art has a higher effect than that of the application of the invention on bacteria (and not on fungi as demonstrated in the preceding examples). FIG. 3 illustrates the bactericidal effect of the suspension of the prior art: the bacteria are totally decimated after several hours. The present invention does not claim a bactericidal effect, but only a fungicidal effect. FIG. 2 shows that the product of the invention has a bacteriostatic effect (stabilization of the bacterial population over time). On the other hand, a more advantageous effect on fungi is claimed (Table 3). Thus, the product of the invention is the best product for use as a fungicide in agriculture and the product of the prior art is the better product with regard to the invention for use as a bactericide.

The invention claimed is:

1. A process for fungicidal treatment of a crop, which comprises foliar application of a contact fungicide comprising magnesium product particles comprising magnesium hydroxide, said magnesium product particles comprising an amount of magnesium hydroxide of greater than or equal to 86% by mass relative to the mass of the magnesium product particles, said magnesium product particles having a particle size characterized by a D50 of between 1 micron and 10 microns, and said magnesium product particles having a specific surface area between 10 $m^2/g$ to 18 $m^2/g$, said amount of magnesium hydroxide, said D50 and said specific surface area being measured when the magnesium product particles contain less than 1% by mass of free water.

2. A method for controlling a fungal pathogen and for treating a fungal disease of a crop, which comprises applying a contact fungicide, the contact fungicide comprising magnesium product particles comprising magnesium hydroxide, said magnesium product particles comprising an amount of magnesium hydroxide of greater than or equal to 86% by mass relative to the mass of the magnesium product particles, having a particle size characterized by a D50 of between 1 micron and 10 microns and having a specific surface area between 10 $m^2/g$ to 18 $m^2/g$, said amount of magnesium hydroxide, said D50 and said specific surface area being measured when the magnesium product particles contain less than 1% by mass of free water.

3. The method as claimed in claim 1, wherein the fungicide is effective against a fungal pathogen is selected from the group consisting of *Mycosphaerella fijiensis, Phytophthora megakarya, Fusicladium oleagineum* or *Cycloconium oleaginum, Colletotrichum acutatum, Phytophthora infestans, Bremia lactucae, Plasmopara viticola, Erysiphe necator, Guignardia bidwellii, Sclerotinia sclerotiorum* and *Septoria tritici.*

4. The method as claimed in claim 1, wherein the fungicide is effective against a fungal disease is selected from the group consisting of black sigatoka of banana, brown rot of cocoa pods, olive leaf spot, bitter rot of apple, mildew of potato, lettuce and grapevine, powdery mildew of grapevine, black rot of grapevine, septoria disease of wheat, and sclerotinia stem rot of oilseed rape and of wheat.

5. The process for fungicidal treatment of a crop as claimed in claim 1, wherein the foliar application comprises applying a liquid composition comprising:

water, the contact fungicide, optionally a product for treating crops selected from the group consisting of fertilizers, biostimulants, natural defense stimulants (NDS) and mixtures thereof, and optionally formulating agent and/or adjuvant selected from the group consisting of preserving agents, emulsifiers, surfactants, dispersants, antifreezes, antifoams, humectants, penetrants, wetting agents, spreading agents, droplet-weighting agents, anti-drift agents, tack agents and retaining agents, and mixtures thereof, wherein the sum of the mass percentages of water, the magnesium product particles, the product for treating crops, if present, and the formulating agent and/or the adjuvant, if present, is at least 90% by mass relative to the mass of the liquid composition.

6. The method for controlling a fungal pathogen and for treating a fungal disease of a crop as claimed in claim 2, wherein the application comprises applying a liquid composition comprising:

1) water, 2) the contact fungicide, optionally a product for treating crops selected from the group consisting of fertilizers, biostimulants, natural defense stimulants (NDS) and mixtures thereof, and optionally formulating agent and/or adjuvant selected from the group consisting of preserving agents, emulsifiers, surfactants, dispersants, antifreezes, antifoams, humectants, penetrants, wetting agents, spreading agents, droplet-weighting agents, anti-drift agents, tack agents and retaining agents, and mixtures thereof, wherein the sum of the mass percentages of water, the magnesium product particles, the product for treating crops, if present, and the formulating agent and/or the adjuvant, if present, is at least 90% by mass relative to the mass of the liquid composition.

7. The method of claim 2, wherein the fungal pathogen is selected from the group consisting of *Mycosphaerella fijiensis, Phytophthora megakarya, Fusicladium oleagineum* or *Cycloconium oleaginum, Colletotrichum acutatum, Phytophthora infestans, Bremia lactucae, Plasmopara viticola, Erysiphe necator, Guignardia bidwellii, Sclerotinia sclerotiorum* and *Septoria tritici.*

8. The method of claim 2, wherein the fungal disease is selected from the group consisting of black sigatoka of banana, brown rot of cocoa pods, olive leaf spot, bitter rot of apple, mildew of potato, lettuce and grapevine, powdery mildew of grapevine, black rot of grapevine, septoria disease of wheat, and sclerotinia stem rot of oilseed rape and of wheat.

9. The process for fungicidal treatment of a crop as claimed in claim 1, wherein the contact fungicide is in the form of a powder comprising the magnesium product particles.

10. The process for fungicidal treatment of a crop as claimed in claim 1, wherein the contact fungicide is in the form of a suspension and the magnesium product particles represent from 40% to 60% by mass of the suspension.

11. The process of claim 1, wherein the amount of magnesium hydroxide is 86% by mass to 99% by mass.

12. The process of claim 1, wherein the amount of magnesium hydroxide is 90% by mass to 99% by mass.

13. The process of claim 1, wherein the amount of magnesium hydroxide is 95% by mass to 99% by mass.

14. A process for fungicidal treatment of a crop comprising:

applying a contact fungicide to leaves of the crop, the contact fungicide comprising magnesium product particles comprising magnesium hydroxide, wherein said particles:

comprise an amount of magnesium hydroxide of between 86% to 99% by mass relative to the mass of the magnesium product particles on a dry basis;

have a particle size characterized by a D50 of between 1 micron and 6 microns; and have a specific surface area on a dry basis of 10 $m^2/g$ to 100 $m^2/g$.

15. A process for fungicidal treatment of a crop, which comprises foliar application of a contact fungicide comprising magnesium product particles comprising magnesium hydroxide, said magnesium product particles comprising an amount of magnesium hydroxide of greater than or equal to 86% by mass relative to the mass of the magnesium product particles, said magnesium product particles having a particle size characterized by a D50 of between 1 micron and 6 microns, and said magnesium product particles having a specific surface area between 10 $m^2/g$ to 100 $m^2/g$, said amount of magnesium hydroxide, said D50 and said specific surface area being measured when the magnesium product contain less than 1% by mass of free water.

16. The process of claim 1, wherein the D50 is between 1 micron and 6 microns.

17. The method of claim 2, wherein the D50 is between 1 micron and 6 microns.

18. The process of claim 14, wherein the D50 is greater than 1 μm and less than 4 μm.

19. The process of claim 14, wherein the specific surface area on a dry basis is from 20 $m^2/g$ to 100 $m^2/g$.

20. The process of claim 1, wherein the D50 is between 1 micron and 5 microns.

21. The method of claim 2, wherein the D50 is between 1 micron and 5 microns.

22. The process of claim 14, wherein the D50 is between 1 micron and 5 microns.

23. The process of claim 15, wherein the D50 is between 1 micron and 5 microns.

* * * * *